Feb. 29, 1944.          C. D. BRADLEY          2,342,639
AUTOMATIC SAFETY DEVICE FOR HEADLIGHT SYSTEMS
Filed May 8, 1941          2 Sheets-Sheet 1

Inventor
Clifford D. Bradley
By his Attorneys

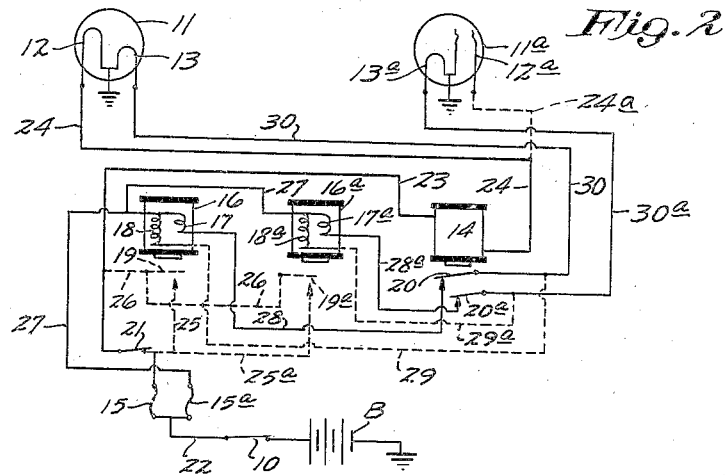
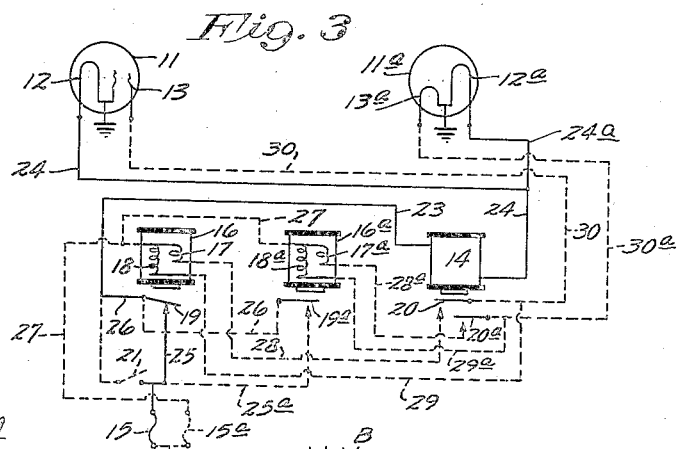
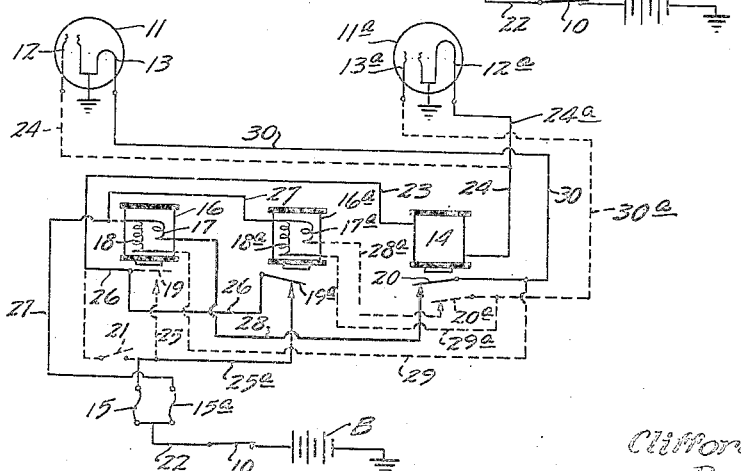

Patented Feb. 29, 1944

2,342,639

UNITED STATES PATENT OFFICE 2,342,639

AUTOMATIC SAFETY DEVICE FOR HEADLIGHT SYSTEMS

Clifford D. Bradley, Aitkin, Minn.

Application May 8, 1941, Serial No. 392,461

8 Claims. (Cl. 171—97)

My present invention relates to headlight systems and, generally stated, has for its object the provision of a system that will take care of all of the accidents or contingencies that are likely to occur, by automatically making certain changes or corrections, whereby light will be produced, in one way or another, and there will not be a total failure in the light production.

Especially the invention is applicable to headlights of automobiles or other motor-propelled vehicles wherein both high and low-beam projecting filaments are employed; and in the accompanying drawings I have illustrated the invention as incorporated in such a headlight system. In this improved system the following conditions are taken care of:

1. If the fuse of a low-beam circuit is blown out, the circuit will be completed through the other fuse;
2. If either high-beam filament goes out, the low-beam of the headlight will be automatically cut in, without disturbing the other headlight;
3. If either low-beam filament goes out, the high-beam filament of that headlight will automatically be turned on, without disturbing the other headlight; and if the high-beam of one of the headlights and the low-beam of the other headlight goes out, the circuit of each headlight will be completed through the remaining filament.
4. If either filament of either headlight goes out, control will be taken away from the high-beam selector switch, and this will warn the operator that something is wrong with the system, for the operator can not then cut out either headlight by operating the high-low beam switch; and
5. If the lead to the low-beam filament is broken, it has the same effect as burning out of a filament; but if such a lead becomes shorted or grounded, that will result in blowing of a fuse which will produce an open circuit that will be corrected in the same manner as though a fuse or filament had burned out.

My invention, as applied to the headlight system of an automobile or similar motor-propelled vehicle, is illustrated in the accompanying drawings wherein like characters indicate like parts throughout the several views.

Referring to the drawings:

Fig. 2 is a diagrammatic view illustrating the condition that exists when one of the high-beam filaments of the right hand headlight has been broken or disrupted;

Fig. 3 is a diagrammatic view illustrating the condition that exists when the low-beam filament of the left hand headlight has been broken; and Fig. 4 illustrates the condition that exists when, for example, the high-beam filament of the left hand headlight and the low-beam filament of the right hand headlight are broken or disrupted.

Figure 1:
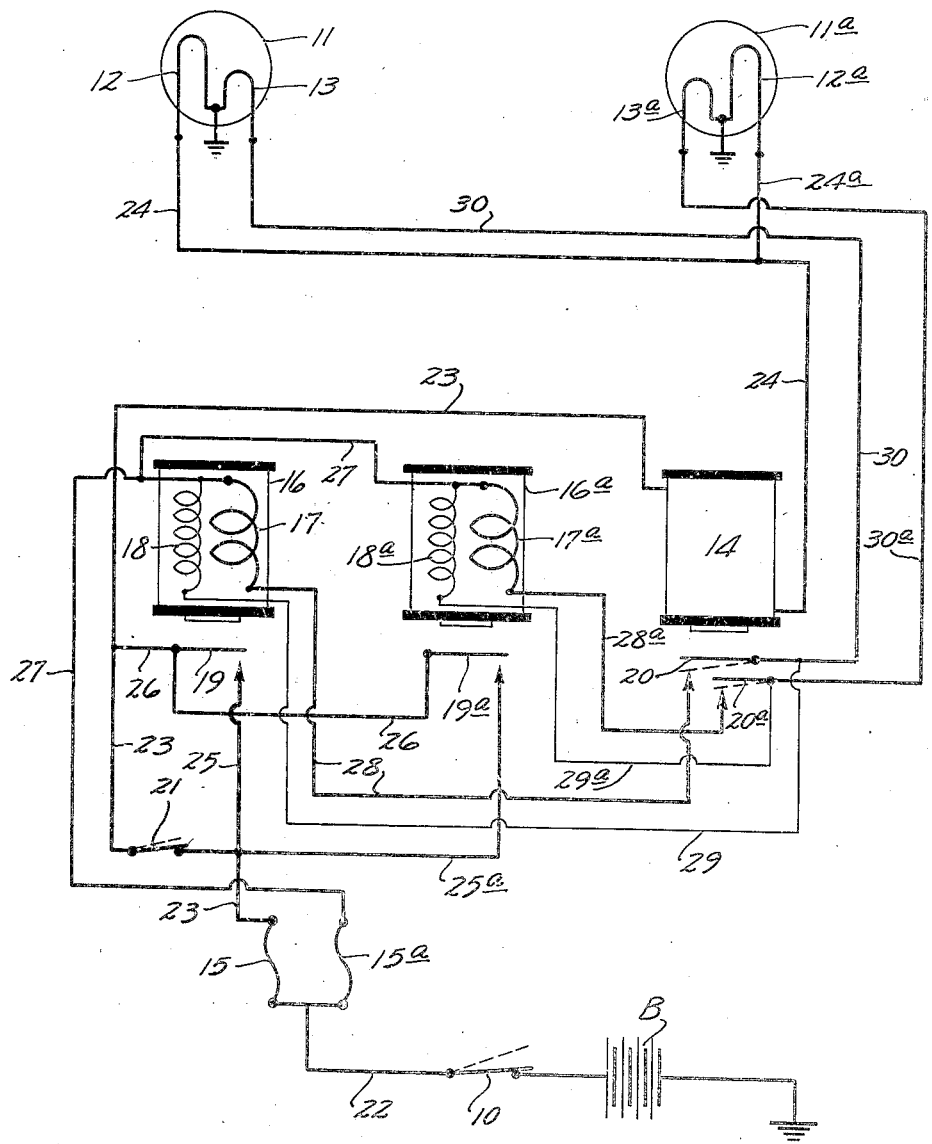
Fig. 1 is a diagrammatic view showing the system and illustrating the condition that exists when the manual on-and-off or master switch is closed and the high-low beam control switch is also closed.

In the drawings all of the parts are diagrammatically illustrated and in the diagrams certain of the elements are indicated as follows:

The car battery, which is grounded at one side, is indicated by the character B. The manually operated off-and-on or master switch is indicated by the numeral 10. The left hand headlight 11 includes a high-beam filament 12 and a low-beam filament 13, both of which are grounded on one side. The right hand headlight 11a includes a high-beam filament 12a and a low-beam filament 13a, both of which are grounded on one side.

The numeral 14 indicates a balanced electromagnet which may have and preferably does have a single coil that is connected in circuit with the high-beam filaments of both headlights and has an important relation to the electrical resistance and conductivity of the said high-beam filaments, all as will be hereinafter more fully disclosed.

The numerals 15 and 15a indicate fuses which, through electrical connections and devices hereinafter described, are connected in circuits that lead respectively to the high-beam and low-beam filaments of the light bulbs. The numerals 16 and 16a indicate multi-coil relay magnets. The magnet 16 is provided with low resistance working coil 17 and a high resistance holding coil 18; and the magnet 16a is likewise provided with a low resistance working coil 17a and a high resistance holding coil 18a. Relay magnet 16 operates a relay switch 19 and relay magnet 16a operates a relay switch 19a. The switches 19 and 19a may be assumed to be normally gravity closed. Balanced magnet 14 operates on switches 20 and 20a, both of which may be assumed to be normally closed by gravity.

The numeral 21 indicates the high-low beam control switch. Off-and-on switch 10 is in a lead 22 that extends from one side of the battery to both of the fuses 15 and 15a. High-beam fuse 15, by a lead 23 that includes high-low beam switch 21, is connected to one terminal of the coil of balanced magnet 14; and the other terminal of the coil of said magnet 14 is connected to the high-beam filaments of both headlights by a divided lead 24. Lead 23 has branches 25 and 25a that are connected respectively to the fixed element of switches 19 and 19a. The movable elements of the switches 19 and 19a, by wire or lead 26, is connected back to lead 23.

Low-beam fuse 15a, by wire or lead 27, is connected to the coils 17 and 18 of relay magnet 16 and to coils 17a and 18a of relay magnet 16a. The other terminal of coil 17, by a lead 28, is connected to the fixed terminal of switch 20 and the corresponding terminal of coil 17a by a lead 28a is connected to the fixed terminal of switch 20a. The holding coil 18 of relay magnet 16 is connected by a wire or lead 29 that is connected to the movable element of switch 20, and the corresponding terminal of holding magnet 18a by a lead 29a that is connected to the movable element of switch 20a.

The movable element of switch 20a, by a lead 30, is connected to the low-beam filament 13 of left hand headlight 11; and the movable element of switch 20a by a lead 30a is connected to the low-beam filament 13a of right hand headlight 11a.

Before describing the operation of the system under varying conditions, the following facts should be further stated. The coil of the balanced relay 14 has such resistance that when both of the high-beam filaments 12 and 12a are intact, and their circuits closed, sufficient current will run through the coil of said balanced relay to raise and open the switches 20 and 20a, as shown in Fig. 1; but the resistance in the coil of said balanced relay is so high that if one of the high-beam filaments is broken, the current will be cut down to such an extent that there will not be sufficient energy in magnet 14 to raise the movable elements of switches 20 and 20a and open the said switches.

In respect to the relay magnets 16 and 16a, there is such low resistance in the operating coils 17 and 17a that whenever the current is closed therethrough, the said magnets will exert sufficient energy on the movable elements of switches 19 and 19a to open the said switches; but the resistance in the coils 18 and 18a is so great that closing of the circuits therethrough will not energize the said magnets to an extent sufficient to open the said switches, but nevertheless, whenever the circuit is closed through the said holding coils 18 or 18a, there will be sufficient energy exerted in the respective relay magnets to hold the switches 19 and/or 19a open if the said switches be open at that particular time.

Fig. 1 shows the condition of the system when the hight and low filaments of both headlights are intact and when the master or cut-in-and-out-switch 10 and the high-low beam controlling switch 21 are both closed, and, of course, also when fuses 15 and 15a are intact. Under these conditions the high-beam filaments 12 and 12a will be energized through a pair of parallel primary high-beam operating circuits as follows: From battery through switch 10, fuse 15, switch 21, lead wire 23, the coil of balanced magnet 14, lead wires 24 and 24a, through both high-beam filaments 12 and 12a, and to ground. Thus magnet 14, when energized, instantly opens both switches 20 and 20a.

When switch 10 was first closed, switches 19 and 19a, and 20 and 20a were closed, a current was then flowing through the operating coils 17 and 17a of magnets 16 and 16a as well as through the high resistance holding coils 18 and 18a so that simultaneously the said switches 19 and 19a, 20 and 20a were opened, as shown by full lines in Fig. 1. As a result of these operations not only were switches 20 and 20a opened, but were held open by balanced magnet 14, which cut the circuit through the coils 17 and 17a allowing current to flow through the high resistance coils 18 and 18a so that switches 19 and 19a were held open.

Under the conditions just stated, the current will flow through fuse 15 but not through fuse 15a because the current through the latter which leads to the low-beam filaments 13 and 13a is broken at then open switches 20 and 20a. If fuse 15 should be blown out or disrupted, the current through magnet 14 will be broken and the latter being de-energized will drop and permit the switches 20 and 20a to automatically close, thereby cutting the high-beam filaments 12 and 12a out of action and closing the circuit through the low-beam filaments 13 and 13a, respectively, through leads 30 and 30a.

If in the first instance it is desired to cut out the high-beam filaments and cut in the low-beam filaments, then high-low switch 21 should be manually opened. This will, in itself, cut out the circuit through magnet 14 allowing switches 20 and 20a to automatically close and then the current will flow from battery through fuse 15a, leads 27, coils 17 and 17a, leads 28 and 28a, switches 20 and 20a, and leads 30 and 30a to the low-beam filaments and to ground. This last noted action is substantially the same as that which takes place when fuse 15 is burned out or disrupted.

If, while the system is set as above described for low-beam filaments, fuse 15a should burn out or be disrupted, that would break the circuit through the coils 17 and 17a, 18 and 18a, causing switches 19 and 19a to automatically close and that would allow the current to flow from battery through high-beam fuse 15, leads 25 and 25a, switches 19 and 19a, leads 26 and 23, magnet 14, lead 24 and high-beam filaments 12 and 12a and to ground.

In this system the burning out of one or the other of the high-beam filaments 12 and 12a has the same or substantially the same effect as burning out of the high-beam fuse 15. In either event the described action is produced by breaking of the circuit between the battery and the respective high-beam filaments. Short-circuiting of any of the connections described would result in burning out of a fuse with the results above described.

Fig. 2 illustrates the condition that would prevail if one of the high-beam filaments, to wit: as shown, the high-beam filament 12a of the right hand headlight, should be disrupted while the switches 10 and 21 are closed, and here it will be noted that the current then flows through fuse 15a, coils 17 and 18, 17a and 18a, through switches 20 and 20a, and through both of the low-beam filaments 13 and 13a. Under the conditions shown in Fig. 2, the magnet 14 is de-energized to such an extent that it will not hold switches 20 and 20a open, since at that time the current to said magnet 14 must flow entirely through the one high-beam filament and, as already stated, would be reduced to such an extent that it loses its hold on the switches 20 and 20a and permits the same to automatically close. Under the conditions above described in respect to Fig. 2, and when both switches 10 and 21 are closed, the disruption of the high-beam filament of the right hand headlight 11a will cause the current to flow through the low-beam filament of both headlights and also through the high-beam filament of the left hand headlight 11. If, at this time, the switch 21 should be open, then the current will flow only through the low-beam filaments of both headlights. Under the conditions illustrated in Fig. 2, the current will flow through the wires or leads indicated by full lines, while the wires indicated by dotted lines are dead wires or leads.

Fig. 3 shows a condition that prevails when one of the low-beam filaments is burned out or disrupted while switch 10 is closed and switch 21 is opened. When one of the low-beams, to wit: as shown, the low-beam filament of the left hand headlight 11 is disrupted, and at which time the current will flow through high-beam fuse 15, switch 19, magnet 14, and high-beam filaments of both light bulbs.

At this point attention is called to the fact that switch 19 is then automatically closed because the burning out or disrupting of the current through the one low-beam filament broke the circuit through both coils of magnets 16 and entirely de-energized the same.

If, instead of low-beam filament of the left hand headlight, the low-beam filament of the right hand headlight burned out, then substantially the same action would take place, except that the current would then be cut off from both coils of magnet 16a and it would be switch 19a instead of switch 19 that closed to perform the above operation.

Under the conditions illustrated in Fig. 3 the current will flow through the wires or leads indicated by full lines, while the wires indicated by dotted lines are dead wires or leads.

Fig. 4 illustrates a condition that exists in the system if and when the low-beam filament of one headlight and the high-beam filament of the other headlight are at the same time disrupted. The action produced under the conditions illustrated in Fig. 4 is quite similar to that illustrated in Fig. 2, except that the current through both coils 17a and 18a of magnet 16a is broken causing magnet 16a to be de-energized and switch 19a to close. Under the conditions illustrated in Fig. 4 the current will flow through the wires or leads indicated by full lines, while the wires indicated by dotted lines are dead wires or leads.

The above application is filed as a continuation-in-part of my co-pending application filed July 22, 1940, under Serial No. 346,881 and entitled "Automatic safety device for headlight systems."

Certain terms used in the claims hereof may be applied to the disclosure of this application as follows, to wit:

a. There are, in the preferred form illustrated, a pair of primary high-beam filament operating circuits, each serving a different one of the high-beam filaments 12 and 12a. The primary operating circuit of this parallel pair of circuits which serves to energize the high-beam filament 12 comprises switch 10, lead 22, fuse 15, lead 23, including switch 21, the coil of balanced relay 14, and lead 24; and the other of said primary high-beam filament operating circuits, and which serves to energize the high-beam filament 12a, comprises switch 10, lead 22, fuse 15, lead 23, including switch 21, the coil of balanced relay 14, part of lead 24, and a lead 24a. Of course, both of this parallel pair of primary high-beam filament operating circuits are completed from their respective filaments back to the battery through ground. These parallel circuits are shown as complete and operative in Fig. 1.

b. There are, in the preferred form illustrated, two pairs of parallel secondary operating circuits for the high-beam filaments and each circuit of each of these pairs of circuits is adapted to operate a different one of the high-beam filaments. One of these pairs of parallel secondary high-beam operating circuits comprises switch 10, lead 22, fuse 15, part of lead 23, lead 25, the contacts of relay switch 19, part of lead 26, the upper part of lead 23, the coil of balanced relay 14, lead 24, and a branch lead 24a. The above described pair of secondary high-beam filament operating circuits is shown as being complete and operative by full lines in Fig. 3. The other of these pairs of parallel secondary high-beam operating circuits comprises switch 10, lead 22, fuse 15, a short part of lead 23, lead 25a, the contacts of relay switch 19a, all of lead 26, the upper part of lead 23, the coil of balanced relay 14, lead 24, and a branch lead 24a. One of the last described pair of parallel secondary high-beam filament operating circuits is shown as being complete and operative in Fig. 4, while the other thereof is shown as being broken and inoperative by virtue of open contacts of switch 19 in Fig. 4.

What I claim is:

1. In a vehicle headlight system, two electrically operated light filaments, primary and secondary operating circuits for one of said light filaments, an operating circuit for the other of said light filaments, a holding circuit also including said other light filament but providing insufficient energy to illuminate the same, a manually controlled off-on switch common to all of said circuits, a manually operated filament selector switch interposed in the said primary operating circuit, automatic switch means responsive to energization of the said other light filament operating circuit to open the said secondary circuit and responsive to energization of the said holding circuit to retain said secondary circuit open independently of energization of the operating circuit of the said other light filament and responsive to coincidental de-energization of said holding circuit and said other light filament operating circuit to close said secondary operating circuit, and automatic switch means responsive to energization of either of said primary or secondary operating circuits to open the operating circuit of the said other light filament and responsive to coincidental de-energization of said primary and secondary operating circuits to close the said operating circuit of said other light filament.

2. In a vehicle headlight system, a headlight filament for projecting a relatively high light beam, a headlight filament for projecting a relatively low light-beam, primary and secondary operating circuits for the said high-beam filament, an operating circuit for the said low-beam filament, a holding circuit also including said low-beam filament but providing an insufficient voltage drop across said low-beam filament to cause operation of the same, a manually controlled off-on switch common to all of said circuits, a manually operated high-low beam selector switch interposed in the primary high-beam filament circuit, automatic switch means responsive to energization of the low-beam filament operating circuit to open the secondary high-beam filament circuit and responsive to energization of the said holding circuit to retain said secondary high-beam filament circuit open independently of energization of the low-beam filament operating circuit and responsive to coincidental de-energization of said holding circuit and said low-beam filament operating circuit to close said secondary high-beam filament operating circuit, and automatic switch means responsive to energization of either said primary or secondary high-beam filament operating circuits to open the low-beam filament operating circuit and responsive to coincidental de-energization of said primary and secondary high-beam filament operating circuits to close the low-beam filament operating circuit.

3. The structure defined in claim 1 in which there are two headlights, each headlight having two of the said electrically operated light filaments, the corresponding filaments of the two headlights being connected in parallel.

4. The structure defined in claim 2 in which there are two headlights, each provided with the said high-low beam filaments, the corresponding filaments being electrically connected in parallel.

5. The combination with a vehicle head lamp having high and low-beam filaments, primary and secondary operating circuits for the high-beam filament, an operating circuit for the low-beam filament, a manual high-low beam selector switch interposed in the primary high-beam filament circuit, an electro-magnetically opened relay switch having its switch contacts interposed in the low-beam filament circuit and its switch operating winding connected in series with the primary and secondary high-beam filament operating circuits so that said relay switch contacts will be opened when the said high-beam filament is energized through either of its said primary or secondary circuits, and an electro-magnetically opened relay switch having its switch contacts interposed in the said secondary high-beam circuit and its operating coil connected in series with said low-beam filament circuit, and a high resistance holding circuit for the last said relay switch and which includes said low-beam filament but independent of all of said switch contacts.

6. The combination with a vehicle head lamp having high and low-beam filaments, primary and secondary operating circuits for the high-beam filament, an operating circuit for the low-beam filament, a manual high-low beam selector switch interposed in the primary high-beam filament circuit for opening and closing the same, an electro-magnetically opened relay switch having its switch contacts interposed in the low-beam filament circuit and its switch operating winding connected in series with the primary and secondary high-beam filament operating circuits so that said relay switch contacts will be opened when the said high-beam filament is energized through either of its said primary or secondary circuits, and an electro-magnetically opened relay switch having its switch contacts interposed in the said secondary high-beam circuit and its operating coil connected in series with said low-beam filament circuit, and a high resistance holding circuit for the said relay switch and which includes said low-beam filament but is independent of all of said switch contacts, said high resistance holding circuit providing insufficient energy to illuminate the said filament in circuit therewith.

7. The combination with a vehicle head lamp having high and low-beam filaments, primary and secondary operating circuits for the high-beam filament, an operating circuit for the low-beam filament, a manual high-low beam selector switch interposed in the primary high-beam filament circuit for opening and closing the same, an electro-magnetically opened relay switch having its switch contacts interposed in the low-beam filament circuit and its switch operating winding connected in series with the primary and secondary high-beam filament operating circuits so that said relay switch contacts will be opened when the said high-beam filament is energized through either of its said primary or secondary circuits, and an electro-magnetically opened relay switch having its switch contacts interposed in the said secondary high-beam circuit and its operating coil connected in series with said low-beam filament circuit, and a high resistance holding circuit for the last said relay switch and which includes said low-beam filament but is independent of all of said switch contacts, said high resistance holding circuit providing insufficient energy to illuminate the said filament in circuit therewith, and a master control switch common to all of said circuits.

8. The combination with a pair of vehicle head lamps each having a high beam filament and a low beam filament, parallel primary operating circuits for the high beam filaments of said head lamps, two pairs of parallel secondary operating circuits for the high beam filaments of said head lamps, parallel operating circuits for the low beam filaments of said head lamps, a manual high-low beam selector switch interposed serially in and common to the parallel primary high beam filament operating circuits and adapted to open and close the same, an electro-magnetically opened balanced relay switch mechanism involving separate pairs of cooperating contacts each interposed in a different of said parallel low beam filament operating circuits and having its switch operating winding connected serially in and common to both pairs of primary and secondary operating circuits of both high beam filaments, the said winding of the said balanced relay switch being so proportioned that the said cooperating pairs of contacts thereof will be opened when both high beam filaments are energized through both parallel primary circuits or both pairs of secondary circuits but will be de-energized sufficiently to permit closing of its cooperating pairs of contacts when either one or both of the high beam filaments are de-energized, a like pair of electro-magnetically opened relay switches each having a pair of contacts interposed in and common to a different parallel pair of secondary high beam filament operating circuits and an operating coil connected in series with a different parallel pair of low beam filament operating circuits, and a high resistance holding winding connected in parallel with its operating winding but in shunt with the balanced relay contacts of the low beam filament circuit common to the operating winding of that relay, said high resistance holding windings passing insufficient energy to illuminate the filament in circuit therewith, and a master control switch common to all of said circuits.

CLIFFORD D. BRADLEY.